UNITED STATES PATENT OFFICE.

BENJ. R. STEVENS AND LEMUEL MORSE, OF LOWELL, MASSACHUSETTS.

IMPROVEMENT IN THE MODE OF FIXING DAGUERREOTYPE-IMPRESSIONS SO AS TO ALLOW OF COLORS BEING APPLIED TO THE SAME.

Specification forming part of Letters Patent No. 2,522, dated March 23, 1842.

*To all whom it may concern:*

Be it known that we, BENJAMIN R. STEVENS and LEMUEL MORSE, both of Lowell, in the county of Middlesex and Commonwealth of Massachusetts, have invented an Improvement in Daguerreotype-Impressions; and we do hereby declare that the following is a full and exact description of said improvement.

The nature of our invention consists in preparing the metallic plates on which daguerreotype-impressions are taken so as to fix the impressions on the plates, and adapting them to the reception of colors by coating the same with varnish or solutions of gums.

To enable others skilled in the art to make and use our invention, we proceed to describe the manner and process of preparing and using the same and the means and process by which our said improvement is effected.

Daguerreotype impressions are easily erased and obliterated by a very slight degree of friction. The painter's brush cannot be applied to them without effacing them. By our invention we obviate this difficulty, as follows: After the impression is taken upon a metallic plate, we then prepare the plate and protect and make fast the impression by coating the plate over the impression with varnish or with transparent solutions of gums, which coating we put on by immersing the plate in varnish or in said solutions. For this purpose we generally use gum-mastic varnish. After the plate is thus prepared, paints and colors may be applied to the impression without effacing it.

What we claim as our invention, and desire to secure by Letters Patent, is—

The mode of preparing daguerreotype-impressions so as to fix them on the plate, and adapting them to the reception of paints and colors by coating the same with varnish or solutions of gums, using for the purpose of coating said plates any kind of varnish or gum and any preparation of varnish or gums which will produce the intended effect.

BENJ. R. STEVENS.
LEMUEL MORSE.

Witnesses:
GEORGE N. BUTTERFIELD,
CHARLES J. ADAMS.